(12) United States Patent
Pauker et al.

(10) Patent No.: US 9,704,159 B2
(45) Date of Patent: Jul. 11, 2017

(54) PURCHASE TRANSACTION SYSTEM WITH ENCRYPTED TRANSACTION INFORMATION

(75) Inventors: Matthew J. Pauker, San Francisco, CA (US); Terence Spies, Mountian View, CA (US)

(73) Assignee: ENTIT Software LLC, Sunnyvale, CA (US)

( * ) Notice: Subject to any disclaimer, the term of this patent is extended or adjusted under 35 U.S.C. 154(b) by 1180 days.

(21) Appl. No.: 12/467,188

(22) Filed: May 15, 2009

(65) Prior Publication Data

US 2010/0293099 A1    Nov. 18, 2010

(51) Int. Cl.
*G06Q 20/00* (2012.01)
*G06Q 20/38* (2012.01)
*G06Q 20/20* (2012.01)
*G06Q 20/36* (2012.01)
*G06Q 20/40* (2012.01)
(Continued)

(52) U.S. Cl.
CPC ......... *G06Q 20/3829* (2013.01); *G06Q 20/20* (2013.01); *G06Q 20/3674* (2013.01); *G06Q 20/3823* (2013.01); *G06Q 20/40975* (2013.01); *H04L 9/0825* (2013.01); *H04L 9/3073* (2013.01); *H04L 2209/56* (2013.01)

(58) Field of Classification Search
CPC ...... G06Q 20/00–20/425; G06Q 30/00–30/08; G06Q 2220/00–2220/18; H04L 9/00–9/38; H04L 2209/00–2209/88; G06F 21/00–21/88
USPC ..................................................... 705/50–79
See application file for complete search history.

(56) References Cited

U.S. PATENT DOCUMENTS 4,771,461 A     9/1988  Matyas
4,965,568 A  * 10/1990  Atalla et al. ................. 340/5.85
(Continued)

FOREIGN PATENT DOCUMENTS

| EP | 1265200 | 12/2002 |
|---|---|---|
| WO | 2006/107777 | 10/2006 |
| WO | 2010141501 | 12/2010 |

OTHER PUBLICATIONS

Boneh et al. "Identity-Based Encryption from the Weil Pairing," from Crypto '2001 (Oct. 2002).
(Continued)

*Primary Examiner* — Mohammad A Nilforoush

(57) ABSTRACT

Systems and methods are provided for securing payment card information. A user may present a payment card such as a credit card to point-of-sale equipment. The point-of-sale equipment may use a symmetric key to encrypt payment card information associated with the payment card. The symmetric key may be encrypted at the point-of-sale equipment using the identity-based-encryption (IBE) public key of a purchase transaction processor to produce a key transfer block. The key transfer block and the encrypted payment card information may be conveyed from the point-of-sale equipment to the purchase transaction processor over a communications network. At the purchase transaction processor, an IBE private key may be used to recover the symmetric key from the key transfer block. The symmetric key can be used to decrypt the encrypted payment card information for processing and re-encryption using a key associated with the purchase transaction processor.

13 Claims, 3 Drawing Sheets

(51) Int. Cl.
*H04L 9/30* (2006.01)
*H04L 9/08* (2006.01)

(56) References Cited

U.S. PATENT DOCUMENTS

| | | | |
|---|---|---|---|
| 5,790,677 | A | 8/1998 | Fox et al. |
| 6,169,803 | B1 | 1/2001 | Sako |
| 6,240,513 | B1 | 5/2001 | Friedman |
| 6,886,096 | B2 | 4/2005 | Appenzeller et al. |
| 6,985,583 | B1 | 1/2006 | Brainard |
| 7,003,117 | B2 | 2/2006 | Kacker et al. |
| 7,113,594 | B2 | 9/2006 | Boneh et al. |
| 7,370,202 | B2 | 5/2008 | Appenzeller et al. |
| 7,412,059 | B1 | 8/2008 | Pauker et al. |
| 7,424,614 | B2 | 9/2008 | Appenzeller et al. |
| 7,523,314 | B2 | 4/2009 | Spies et al. |
| 7,590,236 | B1 * | 9/2009 | Boneh et al. .......... 380/30 |
| 2002/0112154 | A1 | 8/2002 | Wallace |
| 2004/0008846 | A1 | 1/2004 | Medvinsky |
| 2004/0044739 | A1 | 3/2004 | Ziegler |
| 2004/0098589 | A1 | 5/2004 | Appenzeller et al. |
| 2004/0151308 | A1 | 8/2004 | Kacker et al. |
| 2004/0181463 | A1 * | 9/2004 | Goldthwaite et al. .......... 705/26 |
| 2005/0010801 | A1 * | 1/2005 | Spies ............. H04L 9/3073 726/5 |
| 2005/0138353 | A1 * | 6/2005 | Spies et al. .......... 713/153 |
| 2005/0204128 | A1 * | 9/2005 | Aday et al. .......... 713/152 |
| 2006/0010324 | A1 | 1/2006 | Appenzeller et al. |
| 2006/0095771 | A1 | 5/2006 | Appenzeller et al. |
| 2006/0149683 | A1 | 7/2006 | Shimojima |
| 2006/0229991 | A1 | 10/2006 | Campagna |
| 2007/0041583 | A1 * | 2/2007 | Boneh et al. .......... 380/28 |
| 2007/0276765 | A1 * | 11/2007 | Hazel et al. .......... 705/71 |
| 2007/0277013 | A1 | 11/2007 | Rexha et al. |
| 2008/0103982 | A1 | 5/2008 | Hammad et al. |
| 2009/0144202 | A1 | 6/2009 | Hurry |
| 2009/0202081 | A1 | 8/2009 | Hammad |
| 2009/0310778 | A1 | 12/2009 | Mueller |
| 2010/0211507 | A1 | 8/2010 | Aabye |
| 2011/0137802 | A1 | 6/2011 | Spies |

OTHER PUBLICATIONS

Schneir, Bruce, "Applied Cryptography, Second Edition", John Wiley Sons, Inc. 1996, pp. 1-56.

* cited by examiner

PURCHASE TRANSACTION SYSTEM WITH ENCRYPTED TRANSACTION INFORMATION

BACKGROUND OF THE INVENTION

This invention relates to purchase transaction systems in which payment card information is encrypted, and more particularly, to systems in which identity-based-encryption (IBE) is used to secure purchase transactions.

In modern financial systems, purchase transaction information often contains sensitive data. For example, when a customer makes a purchase with a credit card at a store, point-of-sale equipment in the store is used to acquire credit card information from the customer's credit card. The credit card information may be stored in tracks on a magnetic stripe on the credit card. The customer may swipe the magnetic stripe portion of the card through a card reader to make a purchase. The point-of-sale equipment conveys the track information that is acquired in this way to the computer systems of a purchase transaction processor. The purchase transaction processor may then process the transaction. For example, the purchase transaction processor may check the customer's account balance and other information to determine whether the customer is authorized to make a purchase and may debit the customer's account accordingly.

Track information on payment cards may include account number information, cardholder names, expiration data information, security codes, personal identification number (PIN) data, and other sensitive financial and personal data.

If care is not taken to secure sensitive payment card information, it is possible that an attacker may obtain unauthorized access to the payment card information. For example, a hacker might be able to install unauthorized eavesdropping software that monitors payment card data between the point at which the payment card data is first read off of a customer's payment card and the point at which the payment card data is successfully received at the purchase transaction processor.

The inadvertent disclosure of payment card data can result in the need to reissue cards and alert a potentially large number of affected customers. These responses to a successful attack may be exceedingly inconvenient and costly.

To help secure sensitive card data and prevent the undesirable effects of security breaches, some credit card systems use symmetric key encryption techniques. With this type of arrangement, a point-of-sale terminal and a payment processor may share a symmetric cryptographic key. The point of sale terminal can encrypt credit card information as soon as this information has been read from a customer's card. Once encrypted at the point of sale terminal, the card information is secure from eavesdropping. When the payment processor receives the encrypted version of the credit card information, the payment processor may use the shared symmetric key to decrypt the encrypted credit card information.

Symmetric key systems such as these can effectively thwart many types of attack. However, it can be burdensome to distribute symmetric keys. For example, some symmetric key distribution schemes require that point-of-sale terminals be physically returned to a central location such as a factory whenever it is desired to load an updated symmetric key onto the point-of-sale terminals. This process may be cumbersome or impractical when many point-of-sale terminals are involved.

It would therefore be desirable to be able to provide improved techniques for securing sensitive payment card information that is to be conveyed between point of sale terminals and payment processors.

SUMMARY OF THE INVENTION

A user may present a payment card such as a credit card to point-of-sale equipment. A card reader or manual data entry equipment may be used to obtain payment card information from the payment card. For example, the card reader may read magnetic stripe information from the payment card.

The point-of-sale equipment may use a symmetric key to encrypt the payment card information obtained from the payment card. The symmetric key may be encrypted at the point-of-sale equipment using the identity-based-encryption (IBE) public key of a purchase transaction processor to produce a key transfer block.

The point-of-sale equipment may communicate with an IBE key generator, an IBE public parameter host, and purchase transaction processor equipment over a communications network. The IBE public key generator may be used to provide IBE private keys to authorized purchase transaction processors. The IBE public parameter host may be used to provide IBE public parameters to point-of-sale terminals for use in performing IBE encryption operations. The purchase transaction processor may be used to authorized payment cards and to clear payment card transactions.

The key transfer block and the encrypted payment card information may be conveyed from the point-of-sale equipment to the purchase transaction processor over the communications network. At the purchase transaction processor, an IBE private key that has been obtained from the IBE key generator may be used to recover the symmetric key from the key transfer block. The symmetric key can be used to decrypt the encrypted payment card information for processing. To secure the decrypted payment card information, a symmetric key encryption engine at the purchase transaction processor may use a symmetric key that is associated with the purchase transaction processor to re-encrypt the payment card information. This symmetric key encryption engine may use a format-preserving-encryption (FPE) algorithm.

Further features of the invention, its nature and various advantages will be more apparent from the accompanying drawings and the following detailed description of the preferred embodiments.

DETAILED DESCRIPTION

Figure 1:
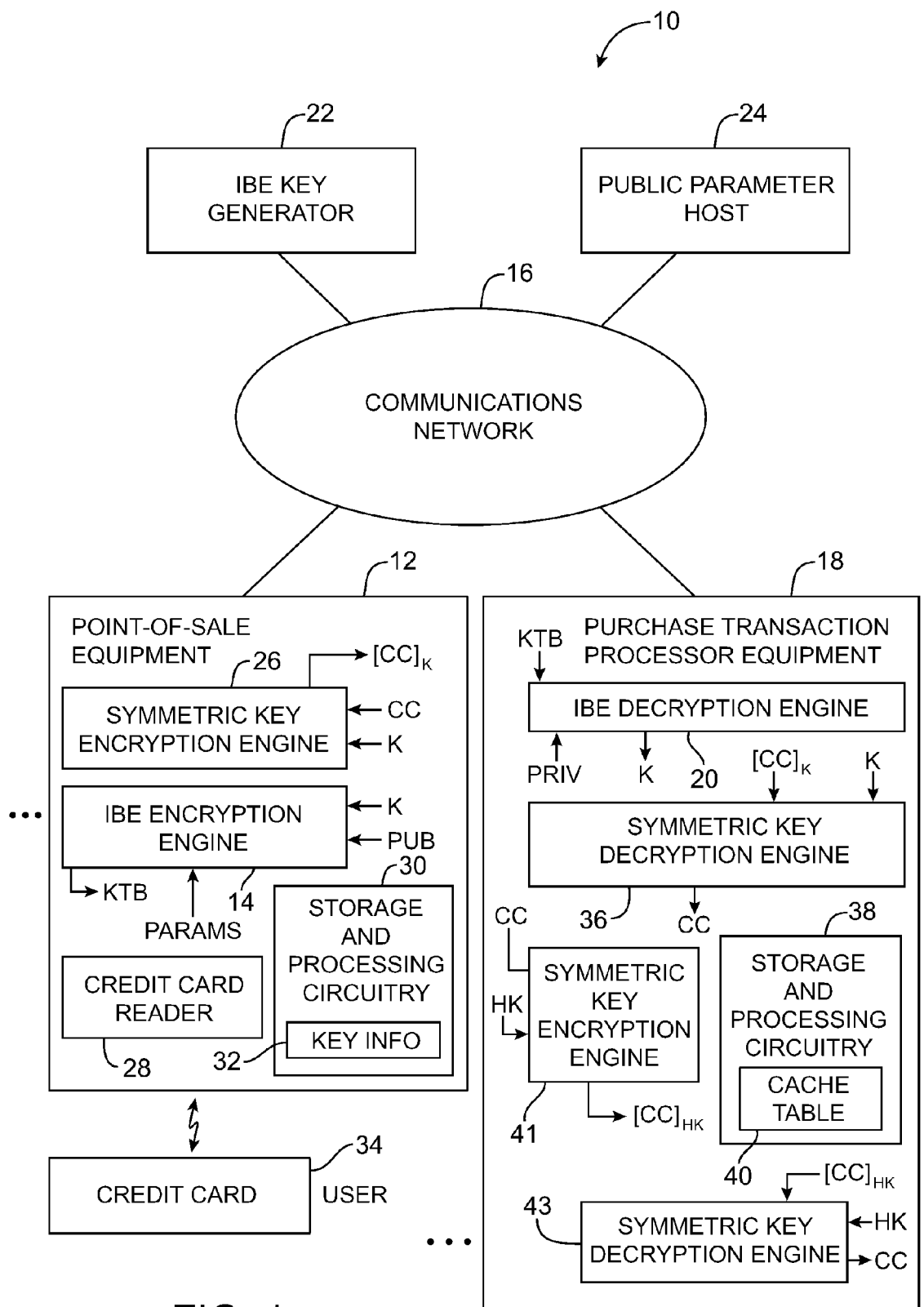
FIG. 1 is a diagram of an illustrative system in which payment card information may be conveyed securely between point of sale terminals and payment processors using identity-based-encryption in accordance with an embodiment of the present invention.

It is often desirable to encrypt sensitive data. For example, it is often desirable to encrypt communications such as email messages. With symmetric key cryptographic arrangements, the sender of a message uses the same key to encrypt the message that the recipient of the message uses to decrypt the message. Symmetric key systems require that each sender and recipient exchange a shared key in a secure manner.

With public key cryptographic systems, two types of keys are used—public keys and private keys. Senders may encrypt messages using the public keys of recipients. Each recipient has a private key that is used to decrypt the messages for that recipient.

To ensure the authenticity of the public keys in traditional public key systems and thereby defeat possible man-in-the-middle attacks, public keys may be provided to senders with a certificate signed by a trusted certificate authority. The certificate may be used to verify that the public key belongs to the intended recipient of the sender's message. Public key encryption systems that use this type of traditional approach are said to use the public key infrastructure (PKI) and are referred to as PKI cryptographic systems.

Identity-based-encryption (IBE) public key cryptographic systems have also been proposed. An example of an IBE scheme that has been successfully implemented in the context of encrypted email messages is the so-called Boneh-Franklin scheme (see, for example, Dan Boneh and Matthew K. Franklin, "Identity-Based Encryption from the Weil Pairing" in Advances in Cryptology—Proceedings of CRYPTO 2001).

As with PKI cryptographic systems, a sender in an IBE system may encrypt a message for a given recipient using the recipient's public key. The recipient may then decrypt the message using the recipient's corresponding private key. The recipient can obtain the private key from an IBE private key generator.

Unlike PKI schemes, IBE schemes generally do not require the sender to look up the recipient's public key. Rather, a sender in an IBE system may generate a given recipient's IBE public key based on known rules. For example, a message recipient's email address or other identity-based information may be used as the recipient's public key, so that a sender may create the IBE public key of a recipient by simply determining the recipient's email address.

During the IBE encryption process, an IBE encryption engine encrypts plaintext to produce ciphertext. The IBE encryption engine takes the IBE public key of the recipient and the plaintext as inputs. The IBE encryption engine also uses so-called IBE public parameter information (the parameters P and sP in the Boneh-Franklin IBE scheme) as an input. The output of the IBE encryption engine is the ciphertext (i.e., the IBE-encrypted version of the plaintext input).

In accordance with aspects of the present invention, IBE cryptographic techniques may be used in securing payment card information conveyed between point-of-sale terminals and payment processors. A symmetric key k may be generated at a point-of-sale terminal. The symmetric key may be used in encrypting sensitive financial information such as payment card information obtained from a user's credit card or debit card as part of a payment transaction or obtained by manual entry of information such as a credit card number by personnel at the point-of-sale terminal.

An IBE encryption engine may be used to encrypt the symmetric key to form a key transfer block (KTB). In performing this IBE encryption operation, the IBE encryption engine may use the IBE public key of a purchase transaction processor (sometimes referred to as a payment processor). The encrypted credit card information and associated key transfer block may be transmitted to the equipment of the payment processor over a communications network.

At the payment processor, the IBE private key of the payment processor may be used to decrypt the key transfer block and thereby provide the payment processor with the symmetric key k. The payment processor may then use the key k to decrypt the payment card information. If desired, the payment processor may then re-encrypt the decrypted payment card information. In performing re-encryption, the payment processor may use a key such as a symmetric key that is associated with the payment processor, rather than the original key k. In a typical system, there may be numerous point-of-sale terminals each of which may have a different set of one or more symmetric keys k. By encrypting the payment card information using a symmetric key (or keys) associated with the payment processor, the payment processor may securely store the payment card information in a database without needing to permanently retain and manage copies of all of the keys k from different point-of-sale terminals.

Operations for using IBE and symmetric key cryptography to secure payment card information at point-of-sale terminals may be implemented using computing equipment. For example, point-of-sale terminals, purchase processors, IBE key generators, and public parameter hosts may contain computing equipment with storage and processing circuitry. The storage and processing circuitry may include one or more processor integrated circuits (e.g., microprocessors, microcontrollers, digital signal processors, etc.) and one or more storage devices (e.g., memory chips, parts of processor chips that include storage, hard drive storage devices, etc.).

An illustrative system 10 in which payment card information may be secured using computing equipment that implements symmetric key and IBE cryptographic functions is shown in FIG. 1. The computing equipment in system 10 may be electrically linked through a communications network such as network 16. This allows entities to communicate electronically.

Network 16 may include networks such as the internet, the public switched telephone network, local area networks, wide area networks, etc. Encrypted information may be conveyed over network 16 using any suitable communications protocol (e.g., by transmitting one or more bits, by transmitting one or more packets, by transmitting email messages, SMS messages, or other larger data items, or by transmitting any other suitable data structures. Communications network 16 may also be used to obtain IBE public parameters electronically, to obtain IBE private keys, etc.

The computing equipment of system 10 may be used to run software. The software may include code that, when installed and run on the hardware of system 10, configures the system to perform symmetric key and IBE cryptographic functions.

A user in system 10 may have a payment card such as a debit card or credit card. Scenarios in which the user has a credit card are sometimes described herein as an example. Credit cards such as credit card 34 in FIG. 1 typically contain magnetic stripes or other storage elements. The magnetic stripe on a credit card may contain credit card information such as user account name information, account number information, personal identification number (PIN)

information, security code information, etc. This information may be stored in the form of tracks on the magnetic stripe.

When a user makes a purchase, the user (or personnel associated with a merchant) swipes credit card 34 through credit card reader 18 in point-of-sale equipment 12. The credit card reader contains a magnetic head that extracts the credit card information from the magnetic strip on credit card 34. If the swipe is effective, the magnetic stripe track information that is obtained from the card may be used to complete the user's purchase transaction. If the swipe is not effective, personnel at point-of-sale terminal 12 may manually enter the credit card number and possibly other credit card information using keys on a keypad in point-of-sale equipment 12.

Most or all of the credit card information obtained from the credit card is not initially encrypted. As a result, the transmission of this information from point-of-sale terminal 12 over network 16 in unencrypted form presents a potential avenue for attack by an attacker.

To prevent unauthorized access to the credit card information, point-of-sale equipment 12 may be provided with symmetric key encryption engine 26 and IBE encryption engine 14. Code for engine 26 and engine 14 may be implemented on computing equipment such as storage and processing circuitry 30.

As shown in FIG. 1, purchase transaction processor 18 may also have computing equipment such as storage and processing circuitry 38. Purchase transaction processor 18 may be a payment card company, an intermediary that aggregates payment card transactions from multiple point-of-sale terminals for subsequent processing by a payment card company, a server associated with a company that owns and operates multiple point-of-sale terminals, or any other suitable party. Typical functions that are implemented by purchase transaction processor involve authorization (e.g., determining whether a payment card that a user has presented at point-of-sale equipment 12 is valid and has available credit) and clearance (e.g., finalizing a batch of purchase transactions by interacting with appropriate payment card companies). Although a typical financial system involves multiple parties that perform different aggregation, authorization, and clearance functions, these parties are represented collectively as purchase transaction processor 18 in FIG. 1 for clarity.

As with point-of-sale equipment 12 and purchase transaction processor 18, equipment in system 10 such as IBE key generator 22 and public parameter host 24 may be implemented using computing equipment. The computing equipment used by the entities of system 10 may include personal computers, portable computers, workstations, mainframe computers, networked computers or terminals such as computer terminals that are connected to the Internet using a host computer in a local area network, handheld computers, embedded processors in gas pumps, cash registers, and other point-of-sale equipment, or any other suitable electronic equipment.

The equipment of FIG. 1 may be interconnected by communications paths in communications network 16. Network 16 may include the Internet and other wide area networks, one or more local area networks, switched telephone networks, networks such as virtual private networks, networks including dedicated leased lines, networks based on wired or wireless paths, or any other networks formed using any other suitable network technology.

When point-of-sale equipment 12 receives payment card information from the user of card 34, this payment card information may be encrypted by symmetric key encryption engine 26. The plaintext version of the payment card information and the symmetric key k may be used as inputs to symmetric key encryption engine 26. the resulting output of symmetric key encryption engine 26 is ciphertext (i.e., the symmetric-key-encrypted payment card information).

IBE encryption engine 14 may form a key transfer block (KTB) by encrypting the symmetric key k. During encryption operations, IBE encryption engine 14 may use the symmetric key k and the IBE public key PUB of purchase transaction processor 18 as inputs. The IBE encryption engine 14 also uses IBE public parameters ("PARAMS") as an input. IBE encryption engine 14 may obtain the IBE public parameters from public parameter host 24 over communications network 16.

The IBE public key may, if desired, include an expiration time for the IBE public key (e.g., a date stamp indicating when the IBE public key is no longer valid). When this type of arrangement is used, IBE private keys may be issued only when they correspond to an IBE public key whose expiration time has not expired. If the IBE key generator 22 is presented with an IBE private key request for an IBE private key that corresponds to an expired IBE public key, IBE key generator 22 may decline to fulfill the request.

System 10 typically includes numerous point-of-sale terminals 12. System 10 may also include numerous purchase transaction processors 18. If desired, different purchase transaction processors may have different IBE public and private keys. For example, each purchase transaction processor may have a public key that is based on its internet address (IP address), host address, email address, company name, or other identity-based information. When using IBE cryptographic techniques, point-of-sale terminals 12 can generate the IBE public keys based on known rules (e.g., by determining an appropriate host address) without being required to obtain a public key certificate of the type used in PKI systems. Each point-of-sale terminal 12 may retain copies of the IBE public keys of multiple purchase transaction processors 18 in storage 30 (shown as key information 32 in FIG. 1). Multiple symmetric keys and key transfer blocks may also be stored in storage 30 (shown as key information 32). To enhance security, point-of-sale equipment 12 may periodically refresh the symmetric keys and key transfer blocks. For example, once per day, once per hour, or according to another suitable schedule, point-of-sale equipment 12 may regenerate a symmetric key and may regenerate its corresponding key transfer block using IBE encryption engine 14.

If desired, PKI cryptographic techniques may be used in encrypting the symmetric keys k to form the key transfer blocks KTB. Arrangements in which IBE encryption is used in system 10 are described herein as an example.

After encrypting the payment card information using symmetric key k and after encrypting symmetric key k using the IBE public key of the purchase transaction processor to form a key transfer block KTB, point-of-sale terminal 12 may send the encrypted payment card information $[CC]_k$ and key transfer block KTB to purchase transaction processor 18 over network 16. Purchase transaction processor 18 may use IBE decryption engine 20 to decrypt KTB. IBE decryption engine 20 may use as inputs key transfer block KTB and IBE private key PRIV. The corresponding output of IBE decryption engine 20 is the unencrypted version of symmetric key k. This key may be used in decrypting the encrypted payment card information. The payment card information may then be processed (e.g., for transaction authentication, transaction clearance, etc.).

If desired, the payment card information may be encrypted using a symmetric key associated with purchase transaction processor 18 (e.g., a symmetric key HK that is uniquely associated with a particular purchase transaction processor or group of purchase transaction processors). Re-encryption with key HK may be performed using symmetric key encryption engine 41 to produce re-encrypted payment card information $[CC]_{HK}$. Subsequent access to the unencrypted payment card information CC may be obtained by decrypting the payment card information using symmetric key decryption engine 43. Engine 43, which may be the same as engine 36 or which may be separate from engine 36, may receive as inputs the encrypted information $[CC]_{HK}$ and key HK and may produce as an output decrypted information CC.

Any suitable symmetric key cryptographic algorithms may be used in the encryption and decryption engines of system 10. Examples of suitable cryptographic algorithms include the AES (Advanced Encryption Standard) and DES (data encryption standard) algorithms. To preserve format compatibility with existing databases, purchase transaction processor 18 may, if desired, use format-preserving encryption (FPE) algorithms when performing encryption with engine 41 (and decryption with engine 43). When an FPE algorithm is used, encrypted payment card information $[CC]_{HK}$ will have the same format (i.e., a database-compatible format) as unencrypted payment card information CC, thereby facilitating storage and processing operations.

IBE private key generator 22 may be used to generate an IBE private key corresponding to each IBE public key PUB. IBE private key generator 22 may also be used to authenticate key requesters. When a purchase transaction processor 18 desires to decrypt a key transfer block, the purchase transaction processor may formulate an IBE private key request. IBE key generator 22 may authenticate the requesting purchase transaction processor 18. If the purchase transaction processor is authorized, IBE private key generator 22 may provide the processor with the requested IBE private key. This key may be cached in storage and processing circuitry 38 if desired.

The IBE public parameters PARAMS that are used during encryption may be generated by IBE key generator 22 during system setup operations. The IBE public parameters may then be published so that they are available to point-of-sale terminals 12 in system 10. Any suitable technique may be used to publish the IBE public parameters. For example, the IBE public parameters can be provided to point-of-sale equipment by the IBE key generator 22, can be listed in a directory, or can be provided to point-of-sale equipment by other entities in a peer-to-peer fashion. With one suitable arrangement, the IBE public parameters are published by placing them on a publicly-accessible IBE public parameter host 24. Host 24 and key generator 22 may be implemented on a single server, on separate servers, or on other suitable computing equipment.

During system setup, private key generator 22 generates or otherwise obtains a master secret. For example, private key generator 22 may create a master secret from a number that is randomly generated at the private key generator by a processor housed inside a tamper-proof enclosure. The master secret may also be produced off-site and delivered to the private key generator 22.

The master secret (also sometimes referred to as a secret master key or a master key) is secret information that is used by the IBE key generator 22 to generate IBE private keys. The IBE key generator 22 also uses the master secret in generating the IBE public parameter information. During setup operations, the IBE public parameters that are generated are published. With one suitable arrangement, the IBE key generator 22 provides the IBE public parameters to host server 24. Point-of-sale equipment 12 can obtain IBE public parameter information from host 24 over network 16 to use in performing IBE encryption operations with IBE encryption engine 14. Purchase transaction processor 18 can obtain IBE private keys from IBE key generator 22 over network 16 for use in decrypting IBE-encrypted symmetric keys. Public parameters PARAMS can be cached in storage and processing circuitry 30. IBE private keys can be cached in storage and processing circuitry 38. Public parameters and IBE keys may also be obtained in real time (e.g., over network 16).

To enhance security in system 10, it may be desirable to periodically refresh the value of the symmetric keys k. For example, new key values may be generated according to a schedule. There may be a new key generated each month, each week, each day, or each hour (as examples) or a new key may be generated when other criteria are satisfied (i.e., when a particular number of purchase transactions have been performed, each time the computing equipment at point-of-sale terminal is rebooted, in response to manually entered instructions, when combinations of these criteria are satisfied, or in response to other suitable criteria).

When multiple keys k are generated, there will be multiple corresponding key transfer blocks KTB. Multiple key transfer blocks KTB may also be generated from a single key k (i.e., when encrypting the key k with different corresponding IBE public keys PUB). A set of public keys PUB1, PUB2, . . . , various key transfer blocks KTB, and various symmetric keys k may be stored in storage and processing circuitry 30 in advance, or these items may be generated in real time (e.g., just before there is a need to encrypt payment card information or just before there is a need to generate a new key transfer block).

In systems with multiple purchase transaction processors, point-of-sale equipment 12 may desire to route some purchase transactions to one purchase transaction processor and other purchase transactions to another purchase transaction processor. As an example, point-of-sale equipment 12 may desire to route transactions that relate to a particular type of payment card to a particular purchase transaction processor. For each symmetric key k, point-of-sale equipment 12 may generate multiple key transfer blocks, each of which is associated with a respective purchase transaction processor 18 (as an example). If desired, these key transfer blocks may be stored in storage and processing circuitry 30 and retrieved as needed, thereby eliminating duplicative computations of key transfer blocks corresponding to the same symmetric key and IBE public key pair.

Figure 2:
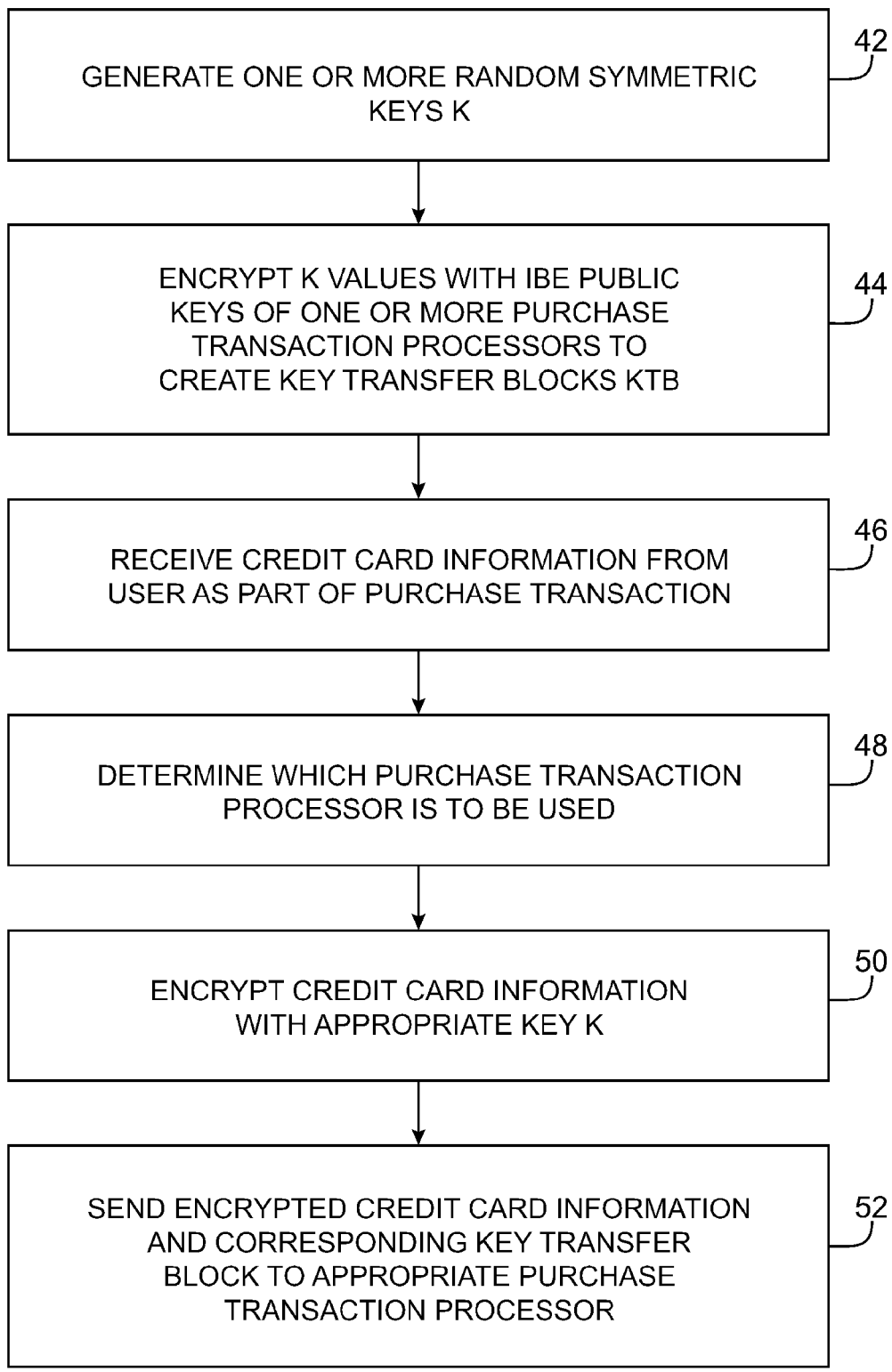
FIG. 2 is a flow chart of illustrative steps involved in performing encryption operations when operating a system of the type shown in FIG. 1 in which payment card information is conveyed securely between point of sale terminals and payment processors using identity-based-encryption in accordance with an embodiment of the present invention.

Illustrative steps involved in securing payment card information at point-of-sale terminal 12 are show in FIG. 2.

At step 42, one or more symmetric keys k may be generated. Keys may be generated using a random number generator (pseudo-random number generator). Keys may be generated at any suitable time (e.g., once-per-day in a batch or in a rolling fashion throughout the day, etc.). Keys may be generated using a symmetric key generation algorithm (which may be considered to be part of encryption engine 26). Keys k may be retained in storage 30.

At step 44, the symmetric keys k may be encrypted with the IBE public keys PUB of one or more purchase transaction processors 18 using IBE encryption engine 14. The resulting IBE-encrypted symmetric keys k (called key transfer blocks KTB) may be retained in storage 30. Precomputing the key transfer blocks in this way may reduce the computational burden on point-of-sale terminal 12, because it is not necessary to generate a new copy of the key transfer block for a symmetric key each time that symmetric key is used in encrypting payment card information.

At step 46, a user may present payment card 34 to point-of-sale terminal 12. The user may, for example, swipe card 34 through reader 28 as part of a purchase transaction at a merchant associated with point-of-sale terminal 12. By using the card reader or by manual entry of payment card information by personnel at terminal 12, point-of-sale terminal 12 may be used to gather payment card information. This payment card information may include an account number (e.g., a credit card number), an account name (e.g., a credit card holder name), security code information, card type information (e.g., information on the issuing financial institution and other financial entity associations) and other sensitive financial information.

At step 48, point-of-sale terminal 12 may determine which purchase transaction processor 18 is to be used in processing the user's purchase transaction. For example, point-of-sale terminal 12 may determine which payment processor is to be used based on information on the type of card that is involved, the name of the issuing institution, other payment card information, etc.

Once it has been determined which purchase transaction processor 18 is to be used in processing the user's purchase transaction, point-of-sale equipment 12 may encrypt the payment card information using an appropriate symmetric key k (step 50). Symmetric key encryption engine 26 may be used by point-of-sale terminal 12 when performing encryption operations on the payment card information. The symmetric key k that is used may be a key that is unique to the purchase transaction processor 18 or may be any other suitable symmetric key k (i.e., one of the pre-generated keys k from step 42).

At step 52, the payment card information that has been encrypted at step 50 using a symmetric key k and the key transfer block for that key k (i.e., the IBE-encrypted version of that key k) may be transmitted to purchase transaction processor 18 over network 16. The encrypted payment card information and associated key transfer block may be sent as part of a single transmission or in one or more separate transmissions. Point-of-sale terminal 12 may transmit all transactions to a given purchase transaction processor or may send different types of transactions to different processors.

Figure 3:
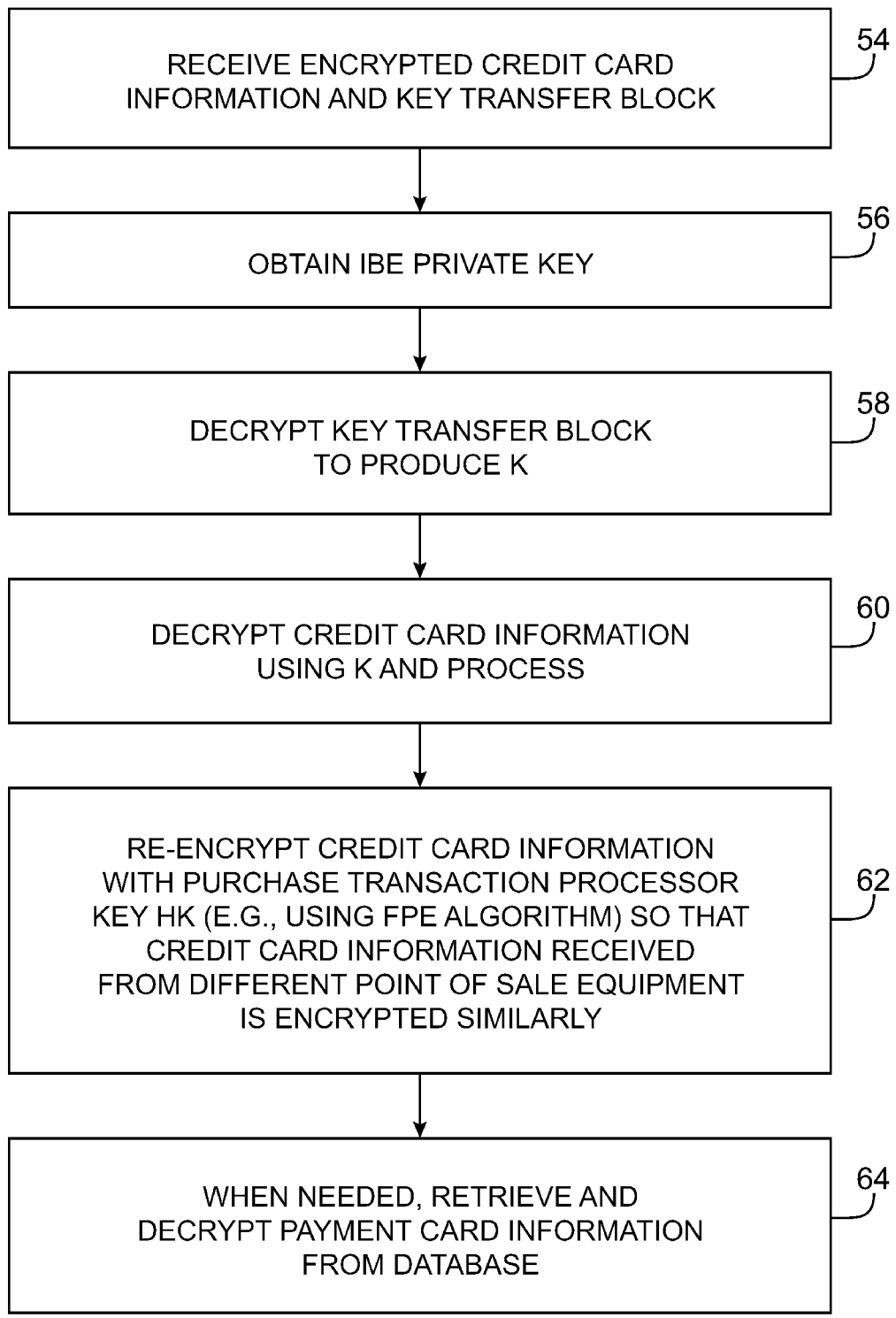
FIG. 3 is a flow chart of illustrative steps involved in performing decryption operations when operating a system of the type shown in FIG. 1 in which payment card information is conveyed securely between point of sale terminals and payment processors using identity-based-encryption in accordance with an embodiment of the present invention.

Illustrative steps involved in processing the payment card information at purchase transaction processor 18 are show in FIG. 3.

At step 54, the encrypted payment card information and key transfer block that were transmitted by point-of-sale terminal 12 may be received by purchase transaction processor 18.

At step 56, purchase transaction processor 18 may obtain an IBE private key for decrypting the received key transfer block. The IBE private key corresponds to the IBE public key that was used by IBE encryption engine 14 in producing the key transfer block. The IBE private key may be obtained from IBE key generator 22 over communications network 16. In formulating a key request for the desired IBE private key, the purchase transaction processor may provide the IBE key generator 22 with a copy of the IBE public key or other suitable information identifying the desired IBE private key. The purchase transaction processor may also provide authentication information (e.g., credentials that demonstrate that the purchase transaction processor is authorized to receive the IBE private key). The IBE private key may be cached in storage and processing circuitry 38, to avoid the necessity to request the IBE private key from IBE key generator 22 when needed for subsequent decryption operations.

After obtaining the IBE private key from cache or from IBE key generator 22 at step 56, purchase transaction processor 18 may decrypt the key transfer block KTB (step 58). During decryption operations, purchase transaction processor 18 may use IBE decryption engine 20 and IBE private key PRIV to decrypt KTB and thereby produce symmetric key k. To reduce computational burdens on the equipment of purchase transaction processor 18, decrypted key transfer blocks (i.e., recovered symmetric keys k) may be stored in cache table 40. Table 40 may, for example, include a list of key transfer blocks (or hashes of these blocks or other suitable identifiers) and a corresponding list of symmetric keys k. Each time a key transfer block is to be decrypted, cache table 40 can be consulted to determine whether the key transfer block has previously been decrypted. If the key transfer block has been previously decrypted, the appropriate symmetric key can be retrieved from cache table 40 instead of performing IBE decryption operations on the key transfer block with IBE decryption engine 20.

At step 60, purchase transaction processor 18 may use symmetric key k to decrypt the encrypted payment card information that was received at step 54. Symmetric key decryption operations may be performed using symmetric key decryption engine 36. During the operations of step 60, purchase transaction processor 18 may process the payment card information submitted by point-of-sale equipment 12 (e.g., for authentication, for clearing a purchase transaction, or for any other suitable payment processing operation).

To help secure payment card information, it may be desirable to maintain the payment card information in a database at purchase transaction processor 18 (storage 38) in encrypted form. Accordingly, purchase transaction processor 18 may re-encrypt the payment card information using symmetric key encryption engine 41 (step 62).

The database may have particular formatting requirements. For example, the database may need to support legacy applications in which credit card numbers are represented by numeric strings of a particular length. If desired, this format may be maintained during encryption operations by using a format-preserving-encryption (FPE) algorithm for implementing engine 41.

In a typical system, there may be numerous point-of-sale terminals 12, each of which generate different symmetric keys k. To simplify key management for purchase transaction processor 18, purchase transaction processor 18 may use its own symmetric key (or keys) HK when performing the re-encryption operations of step 62. A copy of this key (or keys) may be securely maintained at purchase transaction processor 18 for used in performing subsequent decryption operations at step 64 with symmetric key decryption engine 43 (e.g., when it is necessary to access the re-encrypted payment card information).

If desired, communications that are conveyed from payment transaction processor equipment 18 to point-of-sale equipment 12 may be encrypted using identity-based encryption. Public key techniques such as PKI techniques may also be used to secure information that is conveyed between purchase transaction processor equipment 18 and point-of-sale equipment 12.

The foregoing is merely illustrative of the principles of this invention and various modifications can be made by those skilled in the art without departing from the scope and spirit of the invention.

What is claimed is:

1. A computer-implemented method for using identity-based-encryption (IBE) to secure payment card information associated with a payment card of a user in a system having point-of-sale equipment, a purchase transaction processor equipment, and an additional purchase transaction processor equipment that communicate over a communications network, the method comprising:
   identifying, by the point-of-sale equipment, a first host address of the purchase transaction processor equipment and a second host address of the additional purchase transaction processor equipment;
   generating, by the point-of-sale equipment, first and second symmetric keys;
   generating, by the point-of-sale equipment, a first IBE public key associated with the purchase transaction processor equipment based on the identified first host address;
   generating, by the point-of-sale equipment, a second IBE public key associated with the additional purchase transaction processor equipment based on the identified second host address;
   generating, by an IBE encryption engine on the point-of-sale equipment, a first key transfer block by encrypting the first symmetric key using the generated first IBE public key and generating a second key transfer block by encrypting the second symmetric key using the second generated IBE public key;
   after passage of a predetermined amount of time, regenerating, by the point-of-sale equipment, the first symmetric key and generating, by the point-of-sale equipment, a third key transfer block by encrypting the regenerated first symmetric key using the generated first IBE public key;
   after passage of an additional predetermined amount of time, regenerating, by the point-of-sale equipment, the second symmetric key and generating, by the point-of-sale equipment, a fourth key transfer block by encrypting the regenerated second symmetric key using the generated second IBE public key;
   storing, by storage circuitry on the point-of-sale equipment, the first symmetric key, the second symmetric key, the regenerated first symmetric key, the regenerated second symmetric key, and the first, second, third, and fourth key transfer blocks;
   obtaining, by a card reader on the point-of-sale equipment, the payment card information associated with the payment card of the user during a purchase transaction;
   determining, by the point-of-sale equipment, that the purchase transaction processor equipment is associated with the payment card of the user based on the payment card information obtained by the card reader;
   based on determining that the purchase transaction processor equipment is associated with the payment card of the user generating, by a symmetric key encryption engine on the point-of-sale equipment, encrypted payment information by encrypting the payment card information using the regenerated first symmetric key stored at the storage circuitry;
   sending, by the point-of-sale equipment, the third key transfer block stored at the storage circuitry from the point-of-sale equipment to the purchase transaction processor equipment over the communications network;
   sending, by the point-of-sale equipment, the encrypted payment card information from the point-of-sale equipment to the purchase transaction processor equipment over the communications network;
   receiving, by the purchase transaction processor equipment, the third key transfer block and the encrypted payment card information from the point-of-sale equipment;
   receiving, by the purchase transaction processor equipment, an IBE private key corresponding to the first IBE public key;
   obtaining, by an IBE decryption engine on the purchase transaction processor equipment, the regenerated first symmetric key by decrypting the third key transfer block using the IBE private key;
   decrypting, by a symmetric key decryption engine on the purchase transaction processor equipment, the encrypted payment card information using the regenerated first symmetric key that was obtained by decrypting the third key transfer block; and
   authorizing, by the purchase transaction processor equipment, a payment with the payment card of the user based on the decrypted payment card information.

2. The method defined in claim 1, further comprising:
   re-encrypting, by the purchase transaction processor equipment, the decrypted payment card information, wherein re-encrypting the decrypted payment card information comprises:
      re-encrypting, using a format-preserving encryption algorithm implemented on storage and processing circuitry at the purchase transaction processor equipment, the decrypted payment card information.

3. The method defined in claim 1, wherein receiving the IBE private key comprises requesting the IBE private key from an IBE private key generator over the communications network.

4. The method defined in claim 1, wherein generating the third key transfer block comprises:
   obtaining, by the point-of-sale equipment, IBE public parameter information from a public parameter server over the communications network; and
   generating, by the point-of-sale equipment, the third key transfer block by encrypting the regenerated first symmetric key using the IBE public parameter information and the first IBE public key associated with the purchase transaction processor equipment.

5. The method defined in claim 1, wherein the payment card comprises a credit card, wherein the payment card information includes at least part of a credit card number, and wherein obtaining the payment card information comprises obtaining the credit card number associated with the credit card during the purchase transaction.

6. The method defined in claim 1, wherein the payment card comprises a credit card with a magnetic stripe, wherein the payment card information includes magnetic stripe track information from the magnetic stripe, and wherein obtaining the payment card information associated with the payment card of the user during the purchase transaction comprises obtaining the magnetic stripe information associated with the credit card during the purchase transaction.

7. The method defined in claim 1, wherein obtaining the payment card information comprises:

reading, by the card reader on the point-of-sale equipment, magnetic stripe information from the payment card.

8. The method defined in claim 1, wherein the generated first IBE public key includes a first expiration time, and wherein receiving the IBE private key by the purchase transaction processor equipment comprises:
sending a request by the purchase transaction processor equipment, for the IBE private key to an IBE private key generator over the communications network; and
receiving the IBE private key by the purchase transaction processor equipment from the IBE private key generator only prior to expiration of the first expiration time of the first IBE public key.

9. The method defined in claim 1, wherein regenerating the first symmetric key and generating the third key transfer block comprises:
regenerating the first symmetric key and generating the third key transfer block after passage of a day.

10. The method defined in claim 1, wherein regenerating the first symmetric key and generating the third key transfer block comprises:
regenerating the first symmetric key and generating the third key transfer block after passage of an hour.

11. The method defined in claim 1, further comprising:
obtaining, by the card reader on the point-of-sale equipment, additional payment card information associated with an additional payment card of a second user during an additional purchase transaction;
determining, by the point-of-sale equipment, that the additional purchase transaction processor equipment is associated with the additional payment card of the second user based on the additional payment card information obtained by the card reader;
based on determining that the additional purchase transaction processor equipment is associated with the additional payment card of the second user, generating, the symmetric key encryption engine on the point-of-sale equipment, additional encrypted payment card information by encrypting, the additional payment card information using the regenerated second symmetric key stored at the storage circuitry.

12. The method defined in claim 11, further comprising:
sending, by the point-of-sale equipment, the fourth key transfer block stored at the storage circuitry from the point-of-sale equipment to the additional purchase transaction processor equipment over the communications network; and
sending, by the point-of-sale equipment, the additional encrypted payment card information from the point-of-sale equipment to the additional purchase transaction processor equipment over the communications network.

13. The method defined in claim 12, further comprising:
receiving, by the additional purchase transaction processor equipment, the fourth key transfer block and the additional encrypted payment card information from the point-of-sale equipment;
receiving, by the additional purchase transaction processor equipment, an additional IBE private key corresponding to the second IBE public key;
obtaining, by an IBE decryption engine on the additional purchase transaction processor equipment, the regenerated second symmetric key by decrypting the fourth key transfer block using the second IBE private key; and
decrypting, by a symmetric key decryption engine on the additional purchase transaction processor equipment, the additional encrypted payment card information using the regenerated second symmetric key that was obtained by decrypting the fourth key transfer block.

* * * * *